UNITED STATES PATENT OFFICE.

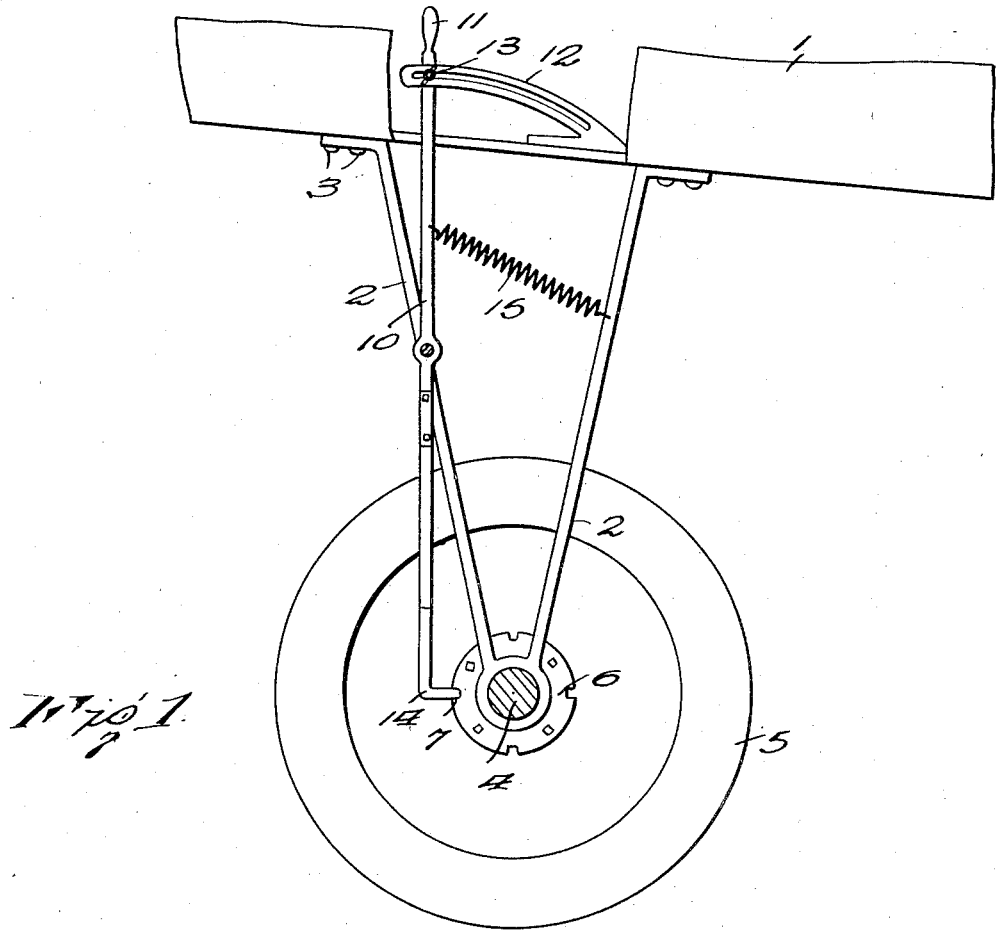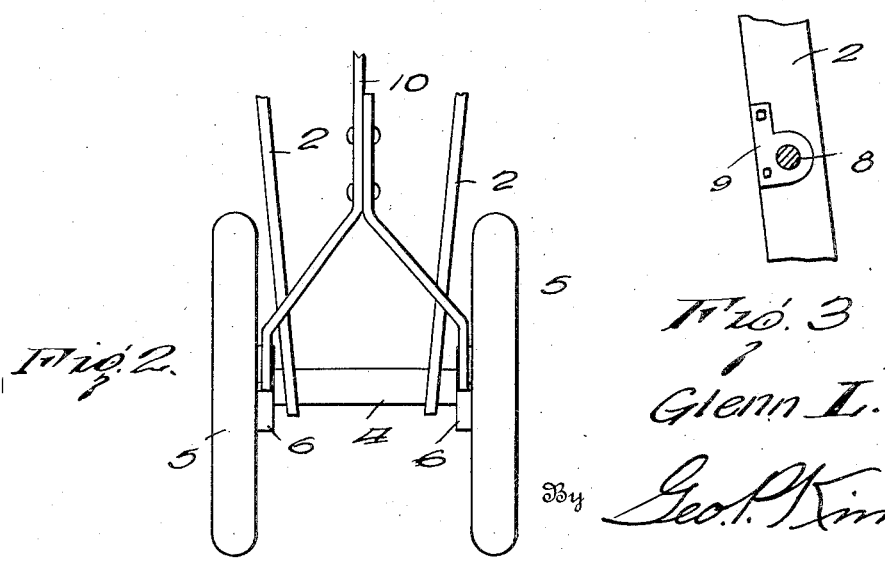

GLENN L. DAVIS, OF BURRTON, KANSAS.

AEROPLANE-BRAKE.

1,343,769. Specification of Letters Patent. Patented June 15, 1920.

Application filed June 17, 1918. Serial No. 240,388.

*To all whom it may concern:*

Be it known that I, GLENN L. DAVIS, a citizen of the United States, residing at Burrton, in the county of Harvey and State of Kansas, have invented certain new and useful Improvements in Aeroplane-Brakes, of which the following is a specification.

This invention relates to improvements in brakes for aeroplanes and it is the principal object of the invention to provide a novel form of brake whereby an aeroplane provided therewith will be prevented from moving under influence of the propeller until such element attains a speed sufficient to cause immediate ascension, thus eliminating the usual run of an aeroplane as is done at the present day before the propeller thereof reaches a velocity such as will cause ascension of the machine upon the shifting of the elevating mechanism.

Other objects will be in part obvious and in part pointed out hereinafter.

The improvements in the details and arrangement of parts will be apparent from an inspection of the accompanying drawings, in connection with the specific description hereinafter contained, and wherein a preferred embodiment of the invention is disclosed for the purpose of imparting a full understanding of the invention.

In the drawings:

Figure 1 is a vertical section between the wheels showing a part of the improved brake applied to a fragment of the fuselage of an aeroplane;

Fig. 2 is a front elevation thereof, and

Fig. 3 is a fragmentary detail in section showing the mounting of the braking element.

Having more particular reference to the drawings, in connection with which like reference characters will designate corresponding parts throughout the several views, 1 represents the fuselage of an aeroplane, having bearing arms 2 secured to the under side of the body thereof as at 3, said bearing arms serving to support an axle 4 therein having wheels 5 rotatably mounted on the opposite extremities.

It is to be noted that each of the wheels 5 has enlarged hub portions 6 arranged thereon adjacent their inner sides, which hub portions are formed with a plurality of peripherally disposed notches or seats 7, the purpose of which will be presently apparent.

Supported between the intermediate portions of the bracket arms 2 is a rod 8, the opposite ends thereof having clips 9 engaged therewith and secured to the adjacent portions of the bracket arms in a suitable manner. This rod 8 serves to pivotally support a braking lever 10, the handle portion 11 of which extends through a suitable way formed in the bottom of the fuselage 1 whereat it is engaged with a slotted segment 12 and provided with a lock screw 13, said screw being engaged in the slot of the segment 12 to permit the locking of a handle portion of said lever in an adjusted position. The lower end of the braking lever 10 is bifurcated or forked and formed with right angularly disposed braking elements 14 adapted to be engaged in any one of the peripherally disposed seats 7 formed in the several enlarged hub portions 6 carried on the inner sides of the wheel 5. If desired, a coil spring 15 can be employed for normally maintaining the braking lever 10 in its neutral position, one end of said spring being engaged with the upper portion of the lever while the remaining end is engaged with a portion of one of the bracket arms 2.

In operation, to engage the braking elements 14 of the lever 10 with the notched enlarged hub portions 6 the lever 10 is rocked in the proper direction and when the desired connection between the same and said hub portions has been effected, the handle portion thereof is then locked in its adjusted position with relation to the slotted segment 12 by tightening the locking screw 13. Obviously, when in this position, the wheels 5, which as may be noted, form a part of the landing or running gear of the aeroplane, will be held against rotation under influence of the propeller of the machine, thus permitting said propeller to attain the speed sufficient to cause immediate ascension of the aeroplane before the wheels 5 are released to permit movement thereof. In this way, it will be readily understood that the usual run, practised at the present day, is obviated, since an aeroplane provided with my improved braking attachment when released will be allowed to immediately ascend upon the proper manipulation of the elevating planes or the mechanism thereof.

Manifestly, the construction shown is capable of considerable modification and such modification as is within the scope of my claims, I consider within the spirit of my invention.

I claim:

1. The combination with the fuselage and wheel mounted landing gear of an aeroplane, a lever pivotally supported in the landing gear provided with a bifurcated lower terminal, the bifurcations of the lever being extended adjacent to and directed angularly for engagement with the wheels to lock the latter against rotation, the opposite terminal of the lever constituting a handle being extended into the fuselage, means to lock the lever in operative or inoperative positions, and means normally retaining the lever in operative position.

2. The combination with the fuselage and wheel mounted landing gear of an aeroplane including bearing arms secured upon the fuselage, of a lever mounted on one of the arms of the landing gear and provided with a bifurcated lower terminal and, the lower ends of the bifurcations of the lever extended and bent at right angles for engagement with the wheels to lock the latter against rotation, the opposite terminal of the lever constituting a handle being extended into the fuselage, a spring on the other of the bearing arms and engaging the lever to lock the lever in operative position and means for retaining the lever in operative position.

In testimony whereof I affix my signature hereto.

GLENN L. DAVIS.